Nov. 2, 1954 P. J. GAHAGAN 2,693,556

SEMICONDUCTOR DIODE

Filed July 15, 1952

INVENTOR.
PHILIP J. GAHAGAN,
BY

McMorrow, Berman + Davidson
ATTORNEYS.

United States Patent Office 2,693,556

Patented Nov. 2, 1954

2,693,556

SEMICONDUCTOR DIODE

Philip J. Gahagan, Bethlehem, Pa.

Application July 15, 1952, Serial No. 299,053

6 Claims. (Cl. 317—236)

This invention relates to point contact crystal devices, and more particularly to an improvement in point contact crystal devices of the type in which one element consists of a sharply pointed metallic wire and the other element is a semi-conducting crystalline material such as germanium, silicon, or the like.

A main object of the invention is to provide a novel and improved point contact crystal device which is suitable for use as a detector or mixer of radio-frequency and ultra-high frequency signals, or as a rectifier of alternating current in low power applications, said device being simple in construction, being easy to manufacture, and being stable in performance.

A further object of the invention is to provide an improved crystal diode which is rugged in construction, which is positively hermetically sealed, and which has stable overall performance characteristics which remain constant for substantially the entire life of the crystal diode unit.

A still further object of the invention is to provide an improved crystal diode unit which is very compact in size, which has a relatively low electrical capacitance between the elements thereof, and which provides a high degree of crystal diode performance efficiency particularly in the ultra-high frequency region.

A still further object of the invention is to provide an improved technique for manufacturing crystal diodes of the type consisting of a sharp pointed metallic wire engaging a semi-conducting crystalline material with point contact, the improved technique enabling crystal diodes according to the present invention to be economically manufactured and providing units which will withstand extreme conditions of temperature, humidity, and the like.

Figure 1:
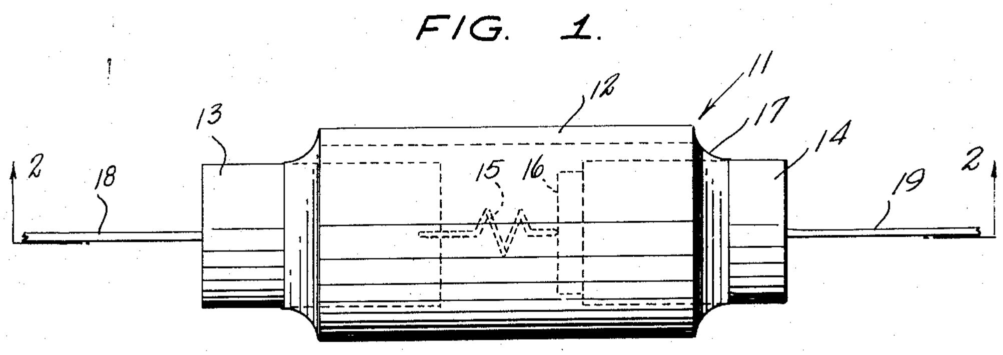
Figure 2:
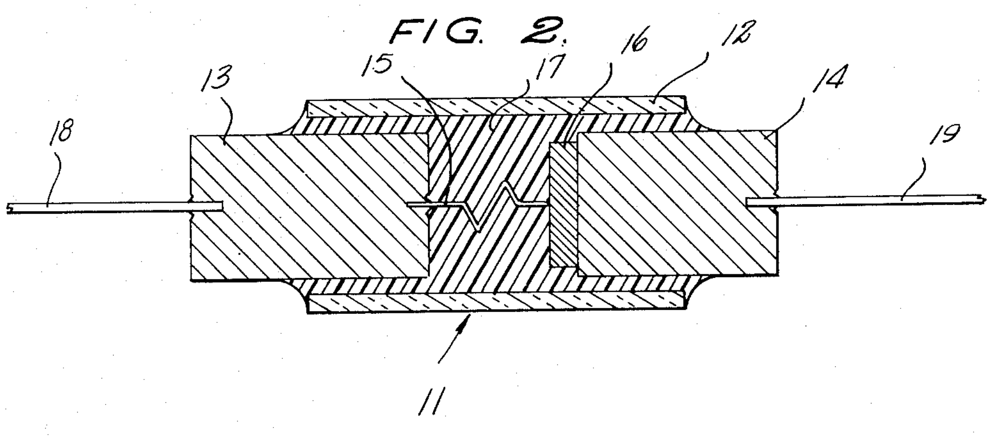

Further objects and advantages of the invention will become apparent from the following description and claims, and from the accompanying drawings, wherein:

Figure 1 is a side elevational view of an improved crystal diode unit constructed in accordance with the present invention; and Figure 2 is a longitudinally cross sectional view taken through the crystal diode unit on the line 2—2 of Figure 1.

Referring to the drawings, 11 generally designates a crystal diode unit constructed in accordance with the present invention, said diode unit comprising an outer envelope 12 which may consist of a short length of ceramic tubing which partially receives a pair of longitudinally aligned spaced metallic cylindrical members 13 and 14 at its respective end portions. Secured centrally to the inner end of the cylindrical metallic member 13 is the coiled metallic whisker 15, which may comprise a thin resilient metal wire coiled in the manner shown in Figure 2 and having one end swaged into a small central hole formed in the inner end of the metallic member 13. Secured to the inner end of the other metallic member 14 is a semi-conductng crystal 16 of germanium, silicon, or other suitable semi-conducting crystal material. The free end of the metallic whisker 15 is sharply pointed and engages the surface of the crystal 16 with point contact, the whisker end engaging the crystal surface in a manner providing rectification of low power alternating current in the manner well known in the art.

The crystal 16 may be secured to the inner ends of the cylindrical member 14 in any suitable manner, as by soldering or the like. The crystal 16 is of course secured to member 14 in a manner which electrically connects the crystal to the metallic member 14.

Filling the interior of a ceramic tube 12, and surrounding and mechanically bonding the inner portions of the metallic members 13 and 14, the crystal 16 and the metallic whisker 15 to the inside surface of the tubing 12 is a body of thermo-setting resin material 17 which stabilizes the point contact of the metallic whisker 15 with the surface of crystal 16 so that the pointed end of the whisker is permanently engaged with the sensitive surface portion of crystal 16 found to have the desired rectifying properties. The thermo-setting material 17 may comprise any suitable known thermo-setting composition, such as a suitable phenol-formaldehyde resin with appropriate filling material, for example, "Bakelite," "Catalin," or "Textalite." Alternatively, the thermo-setting body 17 may comprise a suitable urea-formaldehyde resin with an appropriate filling material, such as "Beetle," "Plasken," or other similar urea-formaldehyde resin composition. As a still further alternative thermo-setting material, the body 17 may comprise a melamine-formaldehyde resin with an appropriate filler, such as "Melmac" or "Plaskon Melamine."

Obviously other suitable thermo-setting resin materials may be employed as the filler for mechanically bonding the elements 13 and 14 in the ceramic tube 12.

Designated at 18 and 19 are respective pigtails which are rigidly secured centrally in the outer ends of the respective metallic members 13 and 14, as by being swaged into small holes formed centrally in the outer ends of the members 13 and 14. It will be noted that the outer end portions of the spaced metallic members 13 and 14 project substantial distances beyond the respective ends of the ceramic envelope 12, and may be arranged so that substantially half of the metallic members 13 and 14 project beyond the ends of the tube 12, as shown in Figures 1 and 2. The metallic pigtails 18 and 19 are employed to connect the crystal diode unit into its circuit, and by having substantial portions of the metallic members 13 and 14, the pigtails 18 and 19 may be readily soldered to their points of connection without transmitting any substantial amount of heat to the ceramic tubing 12, whereby said tubing will be protected against possible injury by accidental contact with a soldering implement.

In manufacturing the crystal diode unit, the component parts are assembled in a suitable fixture, and then the thermosetting resin material 17 is introduced into the ceramic tubing 12 and fills the tubing and coats the elements received in the tubing. Thereupon the entire assembly, comprising the crystal diode components and the fixture is raised to an elevated temperature. With the parts raised to said elevated temperature, the thermosetting material 17 bonds all the component parts inside the tubing 12 together mechanically while at the same time serves as an insulation between the metallic members 13 and 14. Upon cooling, the crystal diode unit exhibits stable performance characteristics, is hermetically sealed and exhibits relatively small electrical capacitance between the metallic elements 13 and 14, whereby the diode unit may be employed with great efficiency in the ultra-high radio-frequency region.

The crystal diode unit above described may be efficiently employed as a detector or mixed of radio-frequency and ultra-high frequency signals or as a rectifier of alternating current in low power applications. It will be readily apparent that the unit is sealed against the entry of moisture or water vapor, and hence will not suffer deterioration in performance under humid operating conditions. Similarly, the performance of the diode will not be adversely effected to any substantial degree by wide temperature changes in view of the low thermal conductivity of the thermo-setting resin material 17.

While a specific embodiment of an improved crystal point contact diode unit has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A crystal point contact diode comprising a cylindrical envelope of ceramic tubing, a pair of spaced metallic members, said metallic members being substantially smaller in outside diameter than the inside diameter of said envelope and being respectively partially received in the opposite ends of said envelope, a crystal secured to the inner end of one of the members, a metallic whisker secured to the inner end of the other member and having its free end engaging the surface of the crystal, and a body of thermo-setting resin in said envelope surrounding and mechanically bonding the inner portions of the metallic members, the crystal and the metallic whisker, said resin substantially filling the space between the metallic members and the inside surface of the envelope.

2. A crystal point contact diode comprising a cylindrical envelope of ceramic tubing, a pair of spaced metallic members, said metallic members being substantially smaller in outside diameter than the inside diameter of said envelope and being respectively partially received in the opposite ends of said envelope, a crystal secured to the inner end of one of the members, a metallic whisker secured to the inner end of the other member and having its free end engaging the surface of the crystal, a body of thermo-setting resin in said envelope surrounding and mechanically bonding the inner portions of the metallic members, the crystal and the metallic whisker, said resin substantially filling the space between the metallic members and the inside surface of the envelope, and respective metallic pigtails secured to the outer portions of the spaced metallic members.

3. A crystal point contact diode comprising a cylindrical envelope of ceramic tubing, a pair of spaced cylindrical metallic members, said metallic members being substantially smaller in outside diameter than the inside diameter of said envelope and being respectively partially received in the opposite ends of said envelope, a crystal secured to the inner end of one of the members, a metallic whisker secured to the inner end of the other member and having its free end engaging the surface of the crystal, a body of thermo-setting resin in said envelope surrounding and mechanically bonding the inner portions of the metallic members, the crystal and the metallic whisker, said resin substantially filling the space between the metallic members and the inside surface of the envelope, the outer end portions of the spaced metallic members projecting substantial distances beyond the respective ends of the envelope, and respective metallic pigtails secured to the outer ends of said metallic members.

4. A crystal point contact diode comprising a cylindrical envelope of ceramic tubing, a pair of spaced cylindrical metallic members, said metallic members being substantially smaller in outside diameter than the inside diameter of said envelope and being respectively partially received in the opposite ends of said envelope, a crystal secured to the inner end of one of the members and facing the inner end of the other member, a metallic whisker secured to the inner end of said other member and having its free end engaging the surface of the crystal, a body of phenol-formaldehyde resin with a suitable filler in said envelope surrounding and mechanically bonding the inner portions of the metallic members, the crystal and the metallic whisker, said resin substantially filling the space between the metallic members and the inside surface of the envelope, the outer end portions of the spaced metallic members projecting substantial distances beyond the respective ends of the envelope, and respective metallic pigtails secured to the outer ends of said metallic members.

5. A crystal point contact diode comprising a cylindrical envelope of ceramic tubing, a pair of spaced cylindrical metallic members, said metallic members being substantially smaller in outside diameter than the inside diameter of said envelope and being respectively partially received in the opposite ends of said envelope, a germanium crystal secured to the inner end of one of the members and facing the inner end of the other member, a metallic whisker secured to the inner end of said other member and having its free end engaging the surface of the crystal, a body of phenol-formaldehyde resin with a suitable filler in said envelope surrounding and mechanically bonding the inner portions of the metallic members, the crystal and the metallic whisker, the outer end portions of the spaced metallic members projecting substantial distances beyond the respective ends of the envelope, and respective metallic pigtails secured to the outer ends of said metallic members.

6. A crystal point contact diode comprising a cylindrical envelope of ceramic tubing, a pair of spaced cylindrical metallic members, said metallic members being substantially smaller in outside diameter than the inside diameter of said envelope and being respectively partially received in the opposite ends of said envelope, a silicon crystal secured to the inner end of one of the members and facing the inner end of the other member, a metallic whisker secured to the inner end of said other member and having its free end engaging the surface of the crystal, a body of phenol-formaldehyde resin in said envelope surrounding and mechanically bonding the inner end portions of the metallic members, the crystal and the metallic whisker, said resin substantially filling the space between the metallic members and the inside surface of the envelope, and respective metallic pigtails secured to the outer ends of said metallic members.

References Cited in the file of this patent

UNITED STATES PATENTS

| Number | Name | Date |
|---|---|---|
| 2,472,938 | Brittain et al. | June 14, 1949 |
| 2,586,609 | Burke | Feb. 19, 1952 |

FOREIGN PATENTS

| Number | Country | Date |
|---|---|---|
| 572,138 | Great Britain | Sept. 25, 1945 |